No. 681,386. Patented Aug. 27, 1901.
G. G. BEYNON.
CHURN.
(Application filed Sept. 10, 1900.)
(No Model.)
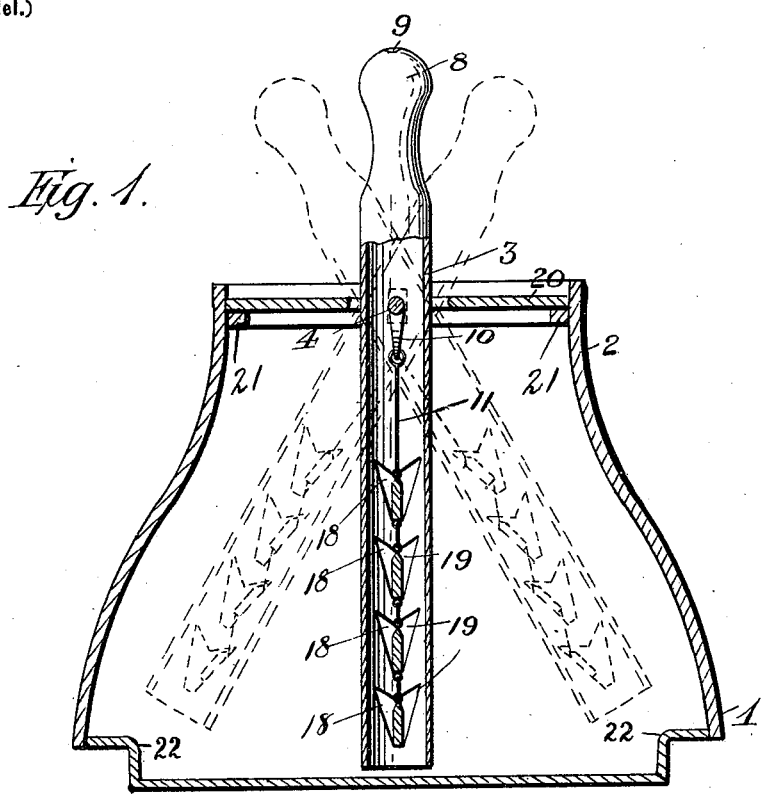
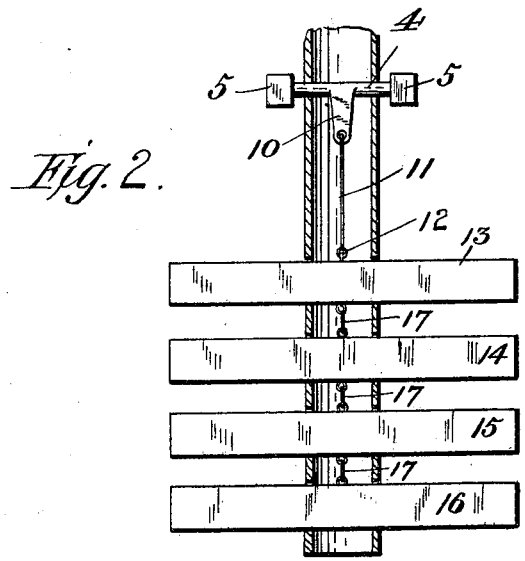
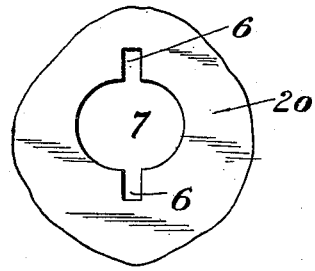
Witnesses
F. L. Ourand
J. L. Crown
Inventor
G. G. Beynon
By
W. T. Fitzgerald & Co.,
Attorneys.

UNITED STATES PATENT OFFICE.

GOMER G. BEYNON, OF DES MOINES, IOWA.

CHURN.

SPECIFICATION forming part of Letters Patent No. 681,386, dated August 27, 1901.

Application filed September 10, 1900. Serial No. 29,572. (No model.)

*To all whom it may concern:*

Be it known that I, GOMER G. BEYNON, a citizen of the United States, residing at Des Moines, in the county of Polk and State of Iowa, have invented certain new and useful Improvements in Churns; and I do hereby declare the following to be a full, clear, and exact description of the invention, such as will enable others skilled in the art to which it appertains to make and use the same.

My invention relates to churns, and more particularly to that variety employing a vibrating or swinging dasher; and it consists of certain novel features of combination and construction of parts, as will be hereinafter fully described and claimed.

The object of my invention is to provide means whereby the cream will be thoroughly agitated at the expense of a minimum amount of power.

The construction and advantages will be made fully apparent from the following specification, considered in connection with the accompanying drawings, of which—

Figure 1 is a vertical section of my improved churn, showing the preferred shape to be adopted for the casing or body thereof. Fig. 2 is a detail showing a side view of the dasher-blades and the preferred means of mounting the same in position upon the dasher or operating-shaft. Fig. 3 is a detail view showing a portion of the top of the lid.

In order to conveniently refer to the several parts of my invention and the coöperating elements required to illustrate the use thereof, numerals will be employed, of which 1 indicates the body portion of my improved churn, which is preferably enlarged at the bottom portion, as shown, and is provided with a slightly-constricted neck-section 2, whereby the bulk or major portion of the cream will be disposed in the lower part of the body of the churn, and in order to thoroughly agitate the cream I so dispose the dasher-shaft 3 that the lower end will be left free to swing back and forth in the enlarged end or lower portion of the churn-body, and thereby be brought into contact with the contents and insure that the same will be thoroughly agitated.

In order to suspend the swinging dasher 3 in position, I provide the shaft 4, which is loosely received by suitable apertures provided in the upper end of the dasher. The shaft 4 is provided at each end with the vertically-disposed oblong sections or heads 5, designed to be received in the recesses 6 upon each side of the centrally-disposed recess 7, the latter being designed to receive the dasher 3, and is of sufficient size to permit said dasher to be freely moved during the operation of the churn.

The upper end of the dasher is provided with a suitable handle 8, in the extreme upper end of which I provide a suitable aperture 9, and since the dasher is tubular it is obvious that it may be readily cleansed by pouring water through the apertures 9, when the interior will be thoroughly cleansed.

The shaft 4 is provided near its middle portion with the depending branch or arm 10, to the lower end of which I pivotally secure the controlling-link 11, the lower end of which is pivotally connected to an eyebolt 12, carried by the upper edge of the central portion of the upper blade 13. The succeeding blades 14 15 16 and additional blades, if required, are all properly connected together by link-sections 17, and since the arm 10 remains stationary during the swinging movement of the lower end of the dasher 3 it is obvious that the dasher-blades will be alternately drawn to one side or the other and will be hereinafter particularly set forth. The blades are mounted in suitable openings provided in the dasher-shaft, so that the upper edges thereof may be left free to move in one direction or the other and take into the extensions 18 or the extensions 19, as the case may be.

By reference to the dotted lines of Fig. 1 it will be seen that the dasher 3 being mounted upon the shaft 4 may be easily moved to one side or the other; but since the link-section 11 is pivoted to the lower end of the arm 10 the lower end of said link will describe a different arc of a circle from that described by the openings 18 and 19, and it therefore follows that when swung to the right or left the blades will be so acted upon by the link 11 that they will be drawn upward first into one or the other of the extensions 18 or 19. If the blades are to be rigidly secured to the dasher-shaft, said shaft may, if preferred, be made solid, thereby enabling the same to be easily cleansed, inasmuch as the churn-body when emptied of its contents may be filled with scalding-water, when the dasher may be swung to the right and to the left until all parts have been thoroughly cleansed.

The lid-section 20 may be provided with a suitable seat for its reception in the upper edge of the churn-body.

The parts of my improved churn may be readily separated and snugly packed within a small space when it is desired to do so for the purpose of storage or shipment.

It will be understood that the lid 20 may be made of any desired shape and size to best meet the requirements and that said lid may be properly secured in position, as upon the annular rib 21, secured near the upper portion of the mouth of the churn. It will be further understood that while the lid 20 may be shaped so as to fit snugly in the mouth of the churn, yet, if desired, any suitable securing device may be provided to hold the lid in position.

If the blades are designed to remain stationary, then I prefer that the shaft 4 shall consist of a piece of suitably-shaped steel, the ends of which are adapted to rest in suitable mortises in the lid, thus enabling the handle to be freely moved backward and forward during the operation of the churn.

In order to facilitate the agitation of the contents of the churn, I so shape the bottom of the body of my improved churn that it will coöperate with the dasher-blades, and with this end in view I provide in each end of the bottom the offset or shoulder 22, against which the cream to be churned is forced by the dasher-blades, and since said shoulders 22 occupy the extreme ends of the bottom section the cream in each end of the churn-body will thus be brought closer in coöperation with the dasher-blades, thereby enabling the said blades to thoroughly agitate every portion of the contents.

My churn can be very cheaply manufactured, and by reason of the novel construction above set forth I am enabled to produce butter in a much shorter period of time than is possible with any other variety of churn with which I am familiar.

My improved churn will be found desirable for churning both large and small quantities of cream and may therefore be used with advantage in the household or creamery, inasmuch as the churn may be readily made in varying sizes, and believing that the use and construction of my improved churn have been made fully apparent from the foregoing specification, considered in connection with the accompanying drawings, I will dispense with further reference to the details thereof.

Having thus fully described my invention, what I claim as new, and desire to secure by Letters Patent, is—

1. In a churn, a body having an enlarged lower end, a lid-section, a stationary shaft 4 having an arm 10 and a dasher provided with a series of V-shaped apertures extending through its lower end, combined with a series of blades placed in said apertures and a series of links connecting said blades and arm, said blades being so mounted that the upper edges thereof will swing back and forth in their apertures, substantially as specified and for the purpose set forth.

2. In a churn, a body, a lid-section having a central opening provided with lateral recesses, a dasher extending through said opening, a stationary shaft on which said dasher is pivoted and having its end shaped to be received by said lateral recesses and also having a downwardly-extending arm, a series of blades movably disposed in suitable openings provided in the lower end of said dasher and a link 11 connecting said arm and blades whereby the blades will be rocked as the dasher is moved back and forth, all substantially as specified and for the purpose set forth.

In testimony whereof I affix my signature in presence of two witnesses.

GOMER G. BEYNON.

Witnesses:
S. Z. STILL,
A. B. SHAW.